United States Patent [19]
Ellis et al.

[11] Patent Number: 5,927,644
[45] Date of Patent: Jul. 27, 1999

[54] DOUBLE FAILSAFE ENGINE MOUNT

[75] Inventors: Joe E. Ellis; Alan R. Stuart, both of Cincinnati, Ohio

[73] Assignee: General Electric Company, Cincinnati, Ohio

[21] Appl. No.: 08/947,143

[22] Filed: Oct. 8, 1997

[51] Int. Cl.⁶ .......................... B64D 27/00; F16M 13/00; F02C 7/20
[52] U.S. Cl. ............................ 244/54; 248/554; 60/39.31
[58] Field of Search .................................. 244/54, 53 R, 244/55; 248/554, 555; 60/39.31

[56] References Cited

U.S. PATENT DOCUMENTS

| | | | |
|---|---|---|---|
| 4,603,822 | 8/1986 | Chee | 244/54 |
| 4,634,081 | 1/1987 | Chee | 244/54 |
| 4,742,975 | 5/1988 | Pachmoff et al. | 244/54 |
| 5,078,342 | 1/1992 | Langley et al. | 244/54 |
| 5,238,206 | 8/1993 | Pachomoff | 244/54 |
| 5,275,357 | 1/1994 | Seelen et al. | 244/54 |
| 5,277,382 | 1/1994 | Seelen et al. | 244/54 |
| 5,303,880 | 4/1994 | Cencula et al. | 244/54 |
| 5,320,307 | 6/1994 | Spofford et al. | 244/54 |
| 5,474,258 | 12/1995 | Taylor et al. | 244/54 |
| 5,524,847 | 6/1996 | Brodell et al. | 244/54 |
| 5,620,154 | 4/1997 | Hey | 244/54 |
| 5,649,417 | 7/1997 | Hey | 244/54 |
| 5,860,623 | 1/1999 | Dunstan et al. | 244/54 |

*Primary Examiner*—Charles T. Jordan
*Assistant Examiner*—Theresa M. Wesson
*Attorney, Agent, or Firm*—Andrew C. Hess; Rodney M. Young

[57] ABSTRACT

An aircraft engine mount includes a mounting platform fixedly joinable to an aircraft pylon, and a cooperating mounting ring fixedly joinable to an aircraft engine. The platform includes a pair of spaced apart lugs defining therebetween a failsafe slot. The mounting ring includes an inner flange fixedly joinable to the engine, and an outer flange extending from the inner flange into the failsafe slot. A pair of side links are pivotally joined to the outer flange and at least one of the lugs to carry loads therebetween. A failsafe pin extends across the failsafe slot and is fixedly joined to the lugs. A clearance hole is provided in the outer flange for receiving the failsafe pin and providing a failsafe alternate loadpath between the mounting ring and platform upon failure of the links to carry loads.

10 Claims, 3 Drawing Sheets

5,927,644

DOUBLE FAILSAFE ENGINE MOUNT

CROSS REFERENCE TO RELATED APPLICATION

This application is related to concurrently filed patent application Ser. No. 08/947,274, filed Oct. 8, 1997, entitled "Integrated Failsafe Engine Mount".

BACKGROUND OF THE INVENTION

The present invention relates generally to aircraft gas turbine engines, and, more specifically, to aircraft mounts therefor.

A gas turbine engine may be mounted to an aircraft at various locations such as the wings, fuselage, or tail by a corresponding structural pylon. The engine is typically mounted at both its forward and aft ends by corresponding mounts for carrying various loads to the aircraft through the pylon. These loads include vertical loads such as the weight of the engine itself; axial loads due to the thrust generated by the engine; side loads such as those due to wind buffeting; and roll loads or torques in three planes. The mounts must also accommodate both axial and radial thermal expansion and contraction of the engine relative to the supporting pylon.

The mounts are typically effective for carrying in-plane loads to the pylon which are those loads occurring in a single axial plane extending radially outwardly from the longitudinal or centerline axis of the engine. These loads include vertical and horizontal components, as well as rotary torque or moments.

Typically, one engine mount is provided for carrying the axial directed thrust load from the engine to the pylon which are usually tension loads during forward propulsion of the aircraft, and compression loads during thrust reverse braking of the aircraft upon landing.

In one exemplary aft engine mount which attaches the engine to the side of an aircraft fuselage, a mounting pin extends laterally outwardly from the fuselage pylon and engages a spherical bearing housing attached to the engine. The various in-plane and thrust loads are carried to the pin using single loadpath connections. The mount must therefore be designed as a monolithic structure which is overdesigned to provide extra strength for increasing the safety margin for avoiding failure. The mount does not include other failsafe features which would provide alternate loadpaths in the event of a failure of any component in the primary loadpath between the engine and the pylon. The single loadpath mount is therefore larger and heavier than typical failsafe engine mounts, which increases cost and reduces aircraft efficiency in view of the additional weight.

Accordingly, a low-weight, failsafe engine mount is desired for attaching the gas turbine engine to the aircraft.

SUMMARY OF THE INVENTION

An aircraft engine mount includes a mounting platform fixedly joinable to an aircraft pylon, and a cooperating mounting ring fixedly joinable to an aircraft engine. The platform includes a pair of spaced apart lugs defining therebetween a failsafe slot. The mounting ring includes an inner flange fixedly joinable to the engine, and an outer flange extending from the inner flange into the failsafe slot. A pair of side links are pivotally joined to the outer flange and at least one of the lugs to carry loads therebetween. A failsafe pin extends across the failsafe slot and is fixedly joined to the lugs. A clearance hole is provided in the outer flange for receiving the failsafe pin and providing a failsafe alternate loadpath between the mounting ring and platform upon failure of the links to carry loads.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
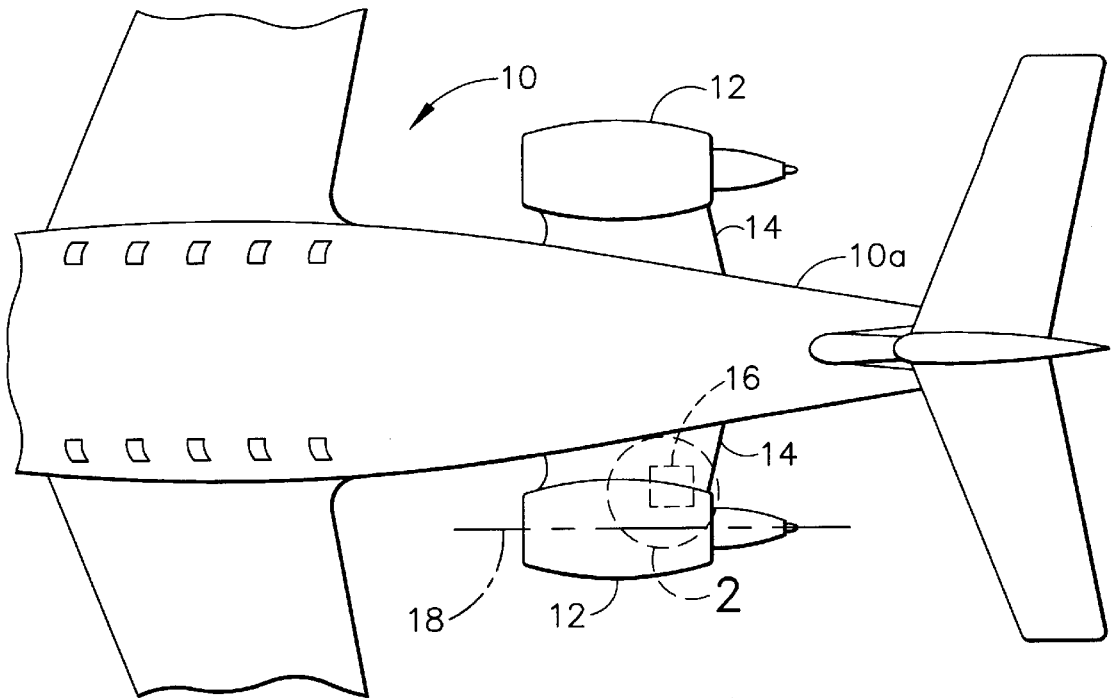
FIG. 1 is a top view of the tail section of an exemplary aircraft having a pair of turbofan gas turbine engines sidemounted to the fuselage thereof in accordance with the present invention.

Illustrated in FIG. 1 is a portion of an aircraft 10 having a pair of conventional turbofan gas turbine engines 12 mounted thereto in accordance with the present invention. More specifically, the aircraft 10 includes a fuselage 10a from which extend laterally from opposite sides thereof a pair of conventional pylons 14. Each of the engines 12 is mounted to a respective pylon 14 by a forward mount (not shown), and by an aft mount 16 in accordance with the present invention.

Each of the engines 12 illustrated in FIG. 1 is axisymmetric about a longitudinal or axial centerline axis 18 and may have any conventional form. As illustrated in more particularity in FIG. 2, the engine 12 includes an annular combustor casing 12a surrounding an annular combustor (not shown) therein. Although not shown, the engine 12 also includes an upstream fan and compressor, and downstream turbine stages which power the compressor and fan for producing propulsion thrust during operation. The engine 12 includes various outer casings and frames (not shown) which carry the various in-plane and thrust loads to the aft mount 16, and in turn to the aircraft pylon 14.

Figure 2:
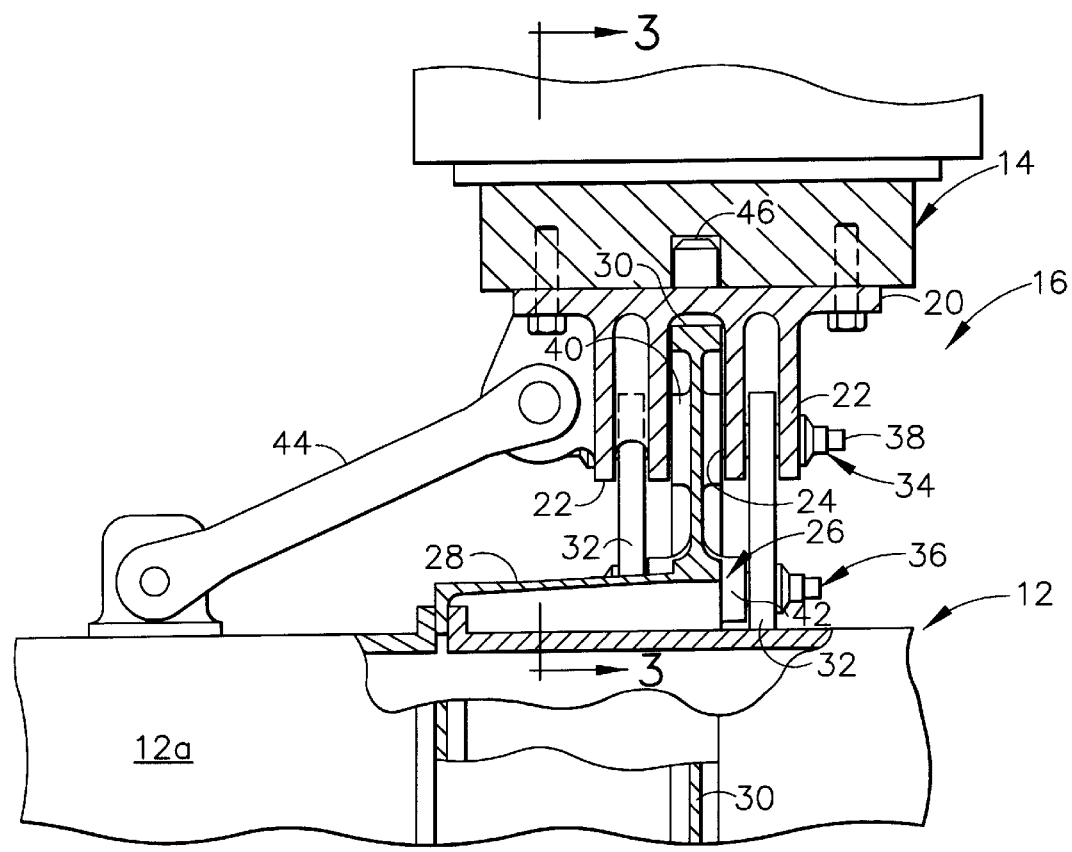
FIG. 2 is a top, partly sectional view of an aft mount for attaching the engines to a pylon in accordance with an exemplary embodiment of the present invention in the location within the dashed circle labeled 2 in FIG. 1.
Figure 3:
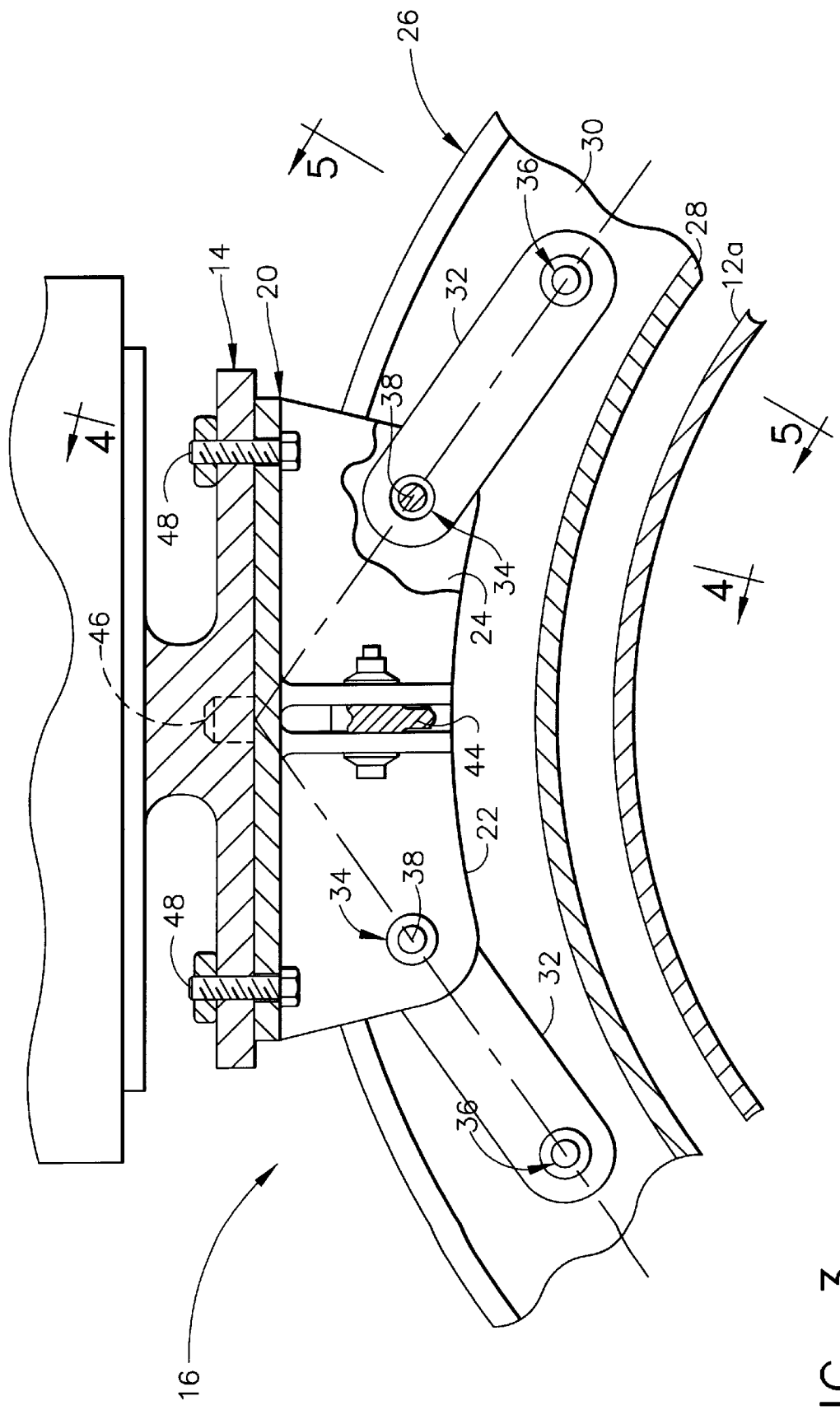
FIG. 3 is a radial sectional view of a portion of the aft mount illustrated in FIG. 2 and taken generally along line 3—3.

As illustrated in FIGS. 2 and 3, the aft mount 16 in accordance with an exemplary embodiment of the present invention includes a mounting platform 20 fixedly joined to a complementary portion of the aircraft pylon 14 suitably configured therefor. The platform 20 includes a pair of axially spaced apart integral flanges or lugs 22 defining axially therebetween a failsafe slot 24 which has an open end facing radially inwardly toward the combustor casing 12a relative to the centerline axis thereof.

The aft mount 16 also includes a mounting ring 26 which includes an annular inner mounting flange 28 fixedly joined to the engine 12 at a suitable location, such as at corresponding flanges of the combustor casing 12a, by a plurality of circumferentially spaced apart fasteners or bolts (not shown) in a conventional manner. The mounting ring 26 also includes an outer mounting flange 30 extending radially outwardly from the inner flange 28 and being formed integrally therewith. The outer flange 30 extends radially outwardly into the failsafe slot 24 and axially between the lugs 22.

At least one, and preferably two pairs of circumferentially spaced apart, coplanar side links 32 are pivotally joined at respective outer and inner joints 34, 36 at opposite ends thereof to the outer flange 30, and at least one of the lugs 22 to carry in-plane loads therebetween. Each of the side links 32 is a simple straight beam attached to the outer flange 30 and lugs 22 solely at its outer ends for carrying longitudinal loads therebetween without bending, while accommodating differential movement due to thermal expansion and contraction of the engine. The side links 32 are provided in a symmetrical pair for carrying side and vertical loads between the engine 12 and the pylon 14.

Figure 4:
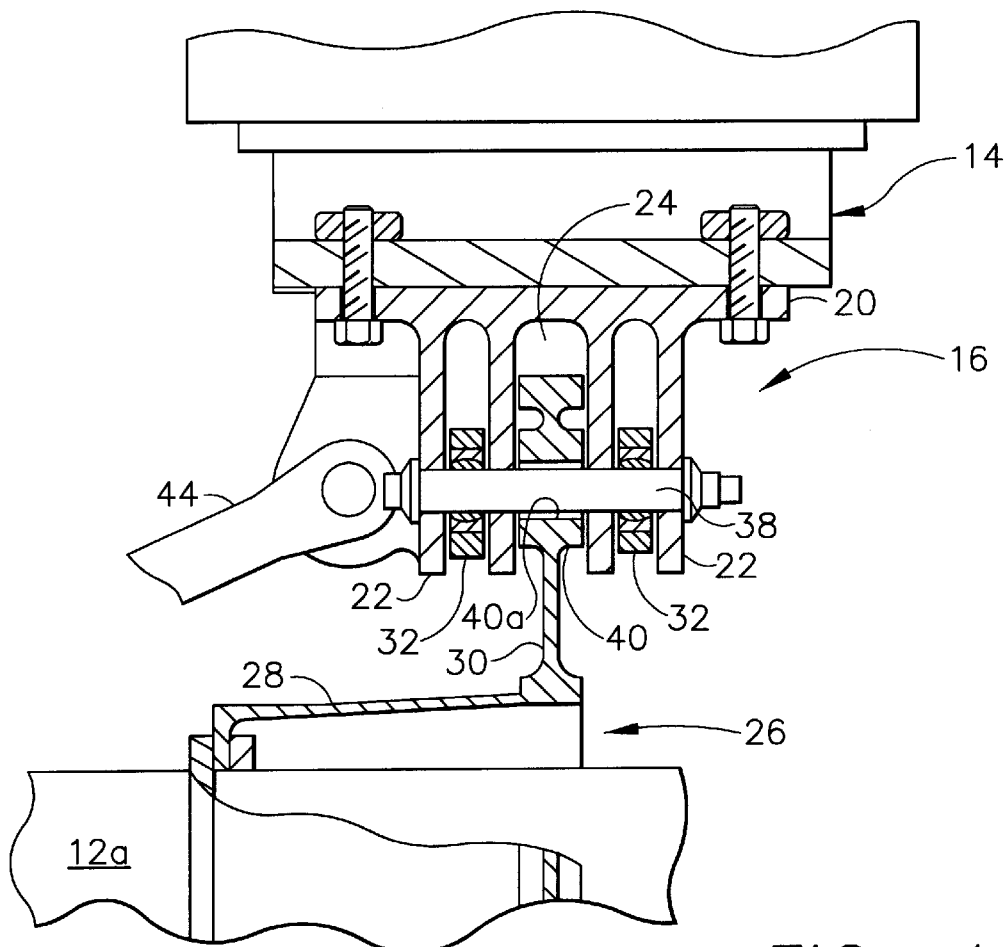
FIG. 4 is an axial sectional view through a portion of the aft mount illustrated in FIG. 3 and taken along line 4—4.

As shown in FIGS. 3 and 4, the aft mount 16 further includes a failsafe pin 38 extending axially across the failsafe slot 24 and suitably fixedly joined to the opposite lugs 22. Correspondingly, the outer flange 30 preferably includes an integral radially outer or failsafe boss 40, shown in FIG. 4, containing a clearance hole 40a therethrough which is suitably larger than the outer diameter of the failsafe pin 38 which extends axially therethrough.

Figure 5:
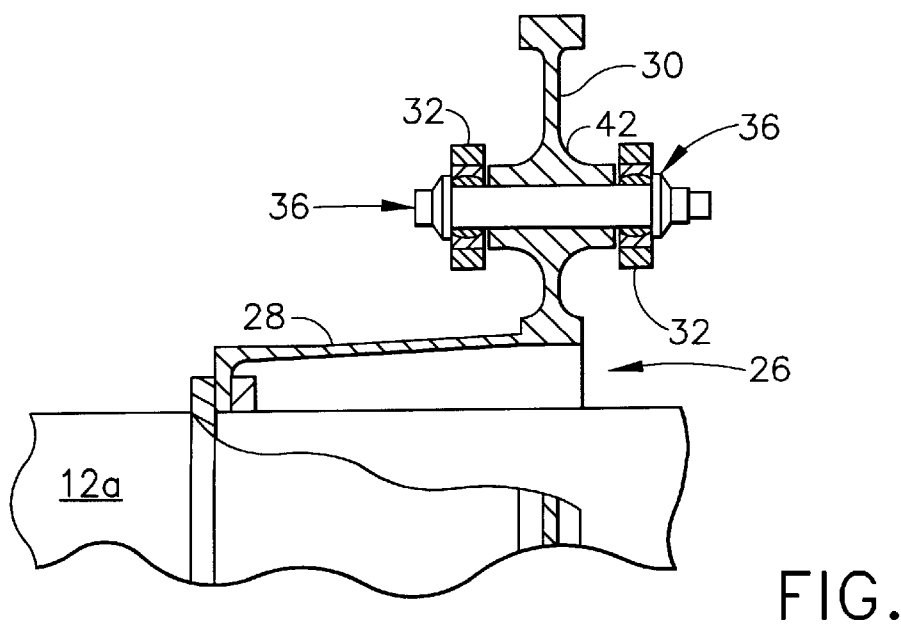
FIG. 5 is an axial sectional view through a portion of the aft mount illustrated in FIG. 3 and taken along line 5—5.

The outer flange 30 as illustrated in more particularity in FIG. 5 also includes a pair of circumferentially spaced apart integral radially inner bosses 42 to which the respective inner ends of the side links 32 are suitably pivotally attached. For example, the inner joints 36 are preferably in the form of conventional spherical bearings or uniballs having a common center pin or fastener extending therethrough and through the respective inner bosses 42 for pivotally mounting the inner ends of the side links 32 to the outer flange 30.

During normal operation, in-plane loads are carried from the engine 12 through the outer casing 12a and into the mounting ring 26. These loads are then carried through the respective inner bosses 42 and into the side links 32, and in turn to the lugs 22 as illustrated in FIG. 3 which places the side links 32 in tension or compression as appropriate without bending. The clearance hole 40a illustrated in FIG. 4 provides a predetermined gap radially between the outer boss 40 and the failsafe pin 38 to prevent contact therebetween during normal operation, with the in-plane loads being carried to the platform solely by the side links 32.

However, if one of the side links 32 fails, either along its length or at its joints 34, 36 and is unable to carry all of the in-plane loads therethrough, the mounting ring 26 will be displaced from the mounting platform 20 to close the gap between the outer boss 40 and the failsafe pin 38 at a corresponding location therearound, and thusly provide a failsafe alternate radial loadpath between the mounting ring 26 and platform 20.

As shown in FIGS. 2 and 4, the platform lugs 22 are preferably in the form of conventional clevises, and the side links 32 are pivotally mounted therein using conventional spherical bearings or uniballs in the outer joints 34. Furthermore, a respective one of the failsafe pins 38 preferably extends axially through both the lugs 22 and through respective ones of the outer bosses 40 provided therefor. In this way, each outer end of the side links 32 is mounted to the lug 22 using a common failsafe pin 38 which forms the center portion of each of the outer joints 34 around which the uniballs are mounted, and also extends axially through the respective outer bosses 40 for providing the failsafe loadpath. Should either of the two failsafe pins 38 fail, the vertical and side loads will be carried by the remaining pin 38.

The in-plane loads are therefore carried between the mounting ring 26 and platform 20 either the primary or normal loadpath through the attached side links 32 and lugs 22; or in the secondary or failsafe loadpath through the outer bosses 40, contacting failsafe pins 38, and the lugs 22.

Although a single set of the symmetrical side links 32 may be used alone in the normal loadpath between the mounting ring 26 and the platform 20, two axially spaced apart pairs of the side links 32 are used as illustrated in FIGS. 2 and 4 for example, with the lugs 22 being identically configured for their support. The respective failsafe pins 38 provide common members for attaching the outer ends of the respective side links 32 to the respective lugs 22 at the outer joints 34. And, the inner bosses 42 extend axially oppositely from both ends of the outer flange 30 for mounting the inner ends of the side links 32 using a common mounting pin extending therethrough and through the respective inner joints 36 as shown in FIG. 5. In this way, additional redundancy is provided in the aft mount 16 so that the in-plane loads may also be carried through the remaining, unfailed side links 32 in addition to the failsafe loadpath described above when any one of the four side links 32 fails.

As shown in FIG. 2, the aft mount 16 may also include a thrust link 44 in the form of a conventional elongate beam pivotally joined at a proximal end thereof to the platform 20, and pivotally joined at an opposite, distal end to the engine 12 at its outer casing 12a for example, for carrying thrust loads between the engine and platform 20. The opposite ends of the thrust link 44 may be attached to the combustor casing 12a and platform 20 in any conventional manner, typically using additional spherical joints or uniballs such as those used for the outer and inner joints 34, 36 of the side links 32.

In the exemplary embodiment illustrated in FIG. 4, the outer bosses 40 are predeterminedly spaced apart axially between the two opposing lugs 22 defining the failsafe slot 24 to provide suitable axial gaps therewith which accommodate axial differential thermal expansion and contraction between the engine and pylon 14 during operation. During normal operation, the mounting ring 26, and in particular its outer bosses 40, do not contact or engage the mounting platform 20 radially due to the clearance holes 40a, and axially due to the side gaps.

However, upon a failure of the thrust link 44 to carry all of the thrust loads therethrough, the outer flange 30 provides the second or alternate failsafe axial loadpath between the mounting ring 26 and the platform 20 to carry the thrust loads. In this event, the thrust loads are initially carried through the combustor casing 12a and into the mounting ring 26 which will be displaced axially thereby causing the outer bosses 40 to axially abut a respective one of the lugs 22 and transfer the thrust load therein. During takeoff for example, the thrust loads in the thrust link 44 are tension, and the failure thereof would displace the outer flange 30 axially forwardly for engaging the outer bosses 40 with the forwardmost lug 22. During thrust reversal operation, the thrust loads in the thrust link 44 are compression, and the failure thereof would cause the outer bosses 40 to abut the aftmost lug 22 for carrying the thrust loads thereto.

Since the outer flange 30 is both axially and radially trapped within the failsafe slot 24 by the adjoining lugs 22 and failsafe pins 38, a double failsafe aft engine mount is effected using common components in simple cooperation.

As shown in FIG. 3, the side links 32 are preferably disposed substantially tangent to the inner flange 28, and converge together radially outwardly toward the platform 20. In this way, the aft mount 16 is effective for carrying in-plane loads without significant rotary torque or moment for reducing bending loads and stresses in the aft mount 16 for reducing its size and weight. The forward mount (not shown) is instead conventionally configured for carrying such rotary torque and moment.

As shown in FIGS. 2 and 3, the platform 20 preferably also includes a radially outwardly extending central integral shear pin 46 disposed axially between the lugs 22 above the failsafe slot 24 for engaging a complementary hole in the pylon 14 for carrying shear loads therebetween. A plurality of suitable fasteners or bolts 48 are provided for removably mounting the platform 20 to the pylon 14. The in-plane and thrust loads are therefore primarily carried by the shear pin 46, with redundancy provided by the several fasteners 48 in the event of failure of the shear pin 46.

As shown in FIG. 3, the side links 32 converge together radially outwardly toward the shear pin 46 for reducing or eliminating the rotary torque or moment described above. Furthermore, and as shown in FIG. 2, the thrust link 44 also converges radially outwardly in general alignment with the shear pin 46 for the same reason.

As indicated above, the side links 32, and similarly the thrust link 44, are inclined generally tangentially to the combustor casing 12a for additionally spreading the reaction loads therein for reducing distortion thereof. The combustor casing 12a is typically relatively thin, and it is therefore desirable to minimize distortion or buckling loads therearound. If desired, the thrust link 44 may instead be mounted to a suitable frame in the engine such as near the fan (not shown) for providing a more rigid loadpath. Or, the thrust link may extend aft from the mount to a suitable rear engine frame.

However, the mounting platform 20 is typically constrained by space limitations to the vicinity adjacent the combustor casing 12a. Accordingly, in order to further diminish the potential for engine casing distortion due to the loads carried by the aft mount 16, the inner flange 28 of the mounting ring 26 is preferably cylindrical as illustrated in FIG. 2 for example. It has a proximal or forward end fixedly joined to the engine 12 around the combustor casing 12a as described above using fasteners around the circumference thereof. The inner flange 28 extends aft or rearwardly therefrom and has a cantilevered distal end to which is integrally joined the radially inner or proximal end of the outer flange 30. In this way, the inner flange 28, like the thrust link 44, is subject to axial tension loads during failure of the thrust link 44 in forward propulsion.

Although the outer flange 30 may extend less than 360° over a suitable arcuate extent for mounting the side links 32 to the mounting platform 20, it is preferably a fully annular member extending radially outwardly and perpendicularly from the cylindrical inner flange 28. In this way, it provides substantial rigidity and stiffness to the mounting ring 26 for not only carrying the in-plane loads to the mounting platform 20 during both normal and failsafe operation, but also for carrying the thrust loads thereto during failsafe operation.

The radially outer distal end of the outer flange 30 is illustrated in FIG. 2 for example, and the integral outer bosses 40 are preferably disposed radially inside the failsafe slot 24. The radially inner end of the outer flange 30 and the integral inner bosses 42 are spaced radially below the lugs 22 in the preferred embodiment. And, the cylindrical inner flange 28 is spaced in most part radially outwardly from the combustor casing 12a, except at its proximal end which is fixedly attached thereto.

In this way, the aft engine mount 16 provides relatively simple yet structurally rigid components in a relatively compact assembly. The aft mount 16 provides double failsafe loadpaths for both the in-plane and thrust loads using the common substantially rigid mounting ring 26. And, significant weight and cost reductions may be obtained from the improved mount.

The aft engine mount 16 therefore provides a completely failsafe redundant mounting system at this location. This redundancy will allow for inspection for failed loadpaths, as opposed to inspection for cracks in a monolithic mount, which may be performed during routine maintenance inspections. These features will also allow longer inspection intervals due to its design and redundant loadpaths. Since the redundant failsafe loadpaths do not carry loads during normal operation, they will therefore have significantly lower fatigue cycles than the adjacent primary loadpaths. This provides significantly enhanced reliability in the mount.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. For example, the mount may be used at any suitable location for mounting the engine to the aircraft at either its fuselage, wings, or tail.

Accordingly, what is desired to be secured by Letters Patent of the United States is the invention as defined and differentiated in the following claims:

1. An aircraft engine mount for mounting a gas turbine engine to an aircraft pylon comprising:
   a mounting platform fixedly joinable to said pylon, and including a pair of spaced apart lugs defining therebetween a failsafe slot;
   a mounting ring including an inner mounting flange fixedly joinable to said engine, and an outer mounting flange extending radially outwardly from said inner flange and extending into said failsafe slot between said lugs;
   a pair of side links pivotally joined at opposite ends thereof to said outer flange and at least one of said lugs to carry loads therebetween; and
   a failsafe pin extending across said failsafe slot and fixedly joined to said lugs, and disposed through a clearance hole in said outer flange for providing a failsafe alternate loadpath between said mounting ring and platform upon failure of one of said links to carry said loads.

2. A mount according to claim 1 further comprising a thrust link pivotally joined at one end to said platform, and having an opposite end pivotally joinable to said engine for carrying thrust loads to said platform.

3. A mount according to claim 2 wherein said outer flange includes an outer boss containing said clearance hole, and said boss is spaced between said lugs for providing a second failsafe alternate loadpath between said mounting ring and platform upon failure of said thrust link to carry said thrust loads.

4. A mount according to claim 3 wherein said platform lugs comprise clevises, and at least one of said side links are pivotally mounted therein around a respective failsafe pins extending through said lugs and through a respective outer boss.

5. A mount according to claim 4 further comprising two pairs of said side links disposed on opposite sides of said outer flange, and pivotally joined at opposite ends thereof to said outer flange and respective ones of said lugs.

6. A mount according to claim 4 wherein said side links are disposed substantially tangent to said inner flange, and converge together toward said platform.

7. A mount according to claim 6 wherein said platform further includes a central shear pin disposed between said lugs for engaging a complementary hole in said pylon for carrying shear loads therebetween.

8. A mount according to claim 7 wherein said side links converge toward said shear pin.

9. A mount according to claim 8 wherein said thrust link is aligned with said shear pin.

10. A mount according to claim 4 wherein:

said inner flange is cylindrical, and includes a proximal end joinable to said engine, and an opposite distal end;

said outer flange includes a proximal end integrally joined to said distal end of said inner flange below said lugs; a radially opposite distal end spaced between said lugs in said failsafe slot; and a pair of inner bosses disposed therebetween and pivotally joined to respective ends of said side links; and said outer boss being disposed in said failsafe slot above said inner bosses.

* * * * *